United States Patent

[11] 3,568,141

| [72] | Inventors | Werner Schwarz<br>Bremen-Oberneuland;<br>Reinhard Wilhelm Leisterer; Herwig<br>Meyerhoff, Bremen; Gunter Berkelmann,<br>Achim, Germany |
|---|---|---|
| [21] | Appl. No. | 784,962 |
| [22] | Filed | Aug. 5, 1968 |
| [45] | Patented | Mar. 2, 1971 |
| [73] | Assignee | Fried, Krupp, Gesellschaft mit<br>beschrankter Haftung<br>Essen, Germany |
| [32] | Priority | Aug. 3, 1967 |
| [33] | | Germany |
| [31] | | P 15 66 847.0 |

[54] ACOUSTIC METHOD AND APPARATUS
7 Claims, 19 Drawing Figs.

[52] U.S. Cl. .................................................. 340/6,
340/3, 343/8
[51] Int. Cl. .................................................... G01s 3/00,
G01s 9/66
[50] Field of Search ........................................ 340/1, 3, 3
(D), 6, 16, 3 (M); 343/8

[56] References Cited
UNITED STATES PATENTS

| 2,847,666 | 8/1958 | Berger .......................... | 343/8 |
| 3,015,800 | 1/1962 | Jewett et al. ................... | 340/6 |
| 3,108,251 | 10/1963 | Corbett ......................... | 340/6X |
| 3,311,870 | 3/1967 | Groke et al. ................... | 340/6 |

*Primary Examiner*—Richard A. Farley
*Attorney*—Spencer and Kaye

ABSTRACT: Method and apparatus for scanning a plurality of channels to determine the azimuth of propagation of, and/or the Doppler shift in, acoustic waves which impinge on a receiver, where each channel carries a signal which is a different function of the azimuth or frequency, respectively, but where three or more of the signals are nonzero for the same value of azimuth or frequency. The method includes the steps of scanning the channels to obtain the nonzero signals in successive order, without interpolating to determine the azimuth or frequency, and then interpolating the azimuth or frequency from the nonzero signals.

INVENTORS
Werner Schwarz
Reinhard Wilhelm Leisterer
Herwig Meyerhoff &
Günter Berkelmann
BY
Spencer & Kaye
ATTORNEYS

AZIMUTH ANGLE
OR FREQUENCY

ACOUSTIC METHOD AND APPARATUS

CROSS REFERENCE TO RELATED APPLICATION

The subject matter of this application is related to that disclosed in copending application Ser. No. 681,985, filed Nov. 13th, 1967, of Werner Schwarz, now U. S. Pat. No. 3,430,192, issued Feb. 25, 1969.

BACKGROUND OF THE INVENTION

The present invention relates to a method and apparatus for determining the direction of propagation of, and the Doppler shift in, acoustic waves.

The present invention relates, more particularly, to a method and apparatus for scanning $n$ information channels ($n$ 3), each of which carries a signal which is a separate function of the azimuth of propagation of acoustic waves, three or more of which signals are nonzero for the same azimuth value, so that the azimuth may be determined by interpolating between these signals.

The present invention further relates to a method and apparatus for measuring the Doppler shift in acoustic waves by scanning $n$ information channels carrying signals which are a function of the frequency of the acoustic waves, three or more of which signals are nonzero for the same frequency value, and interpolating between these signals to determine the frequency and, in turn, the Doppler shift.

A number of different methods and types of apparatus for scanning groups of information channels, and for interpolating the information values supplied from the channels, are already known in the art.

Thus, for example, special tubes have been built with a plurality of grids, equal in number to the number of channels, to scan and simultaneously interpolate between the signals on three or more of the channels. A rotating, focused electron beam is successively moved to each of three grids of neighboring channels. In this way, the time in which the maximum anode current occurs, taken in relation to a prescribed reference time value, is a function of the azimuth position of the line signal.

Such a scanning and interpolating tube has its disadvantages both in construction and in operation. A change in the number of channels or a change in the receiving characteristics of the acoustic wave receivers connected at the inputs of the channels makes necessary the design and construction of a completely new tube. It is not possible to increase the number of channels by simply adding additional scanning elements, and, the tube is limited by its particular construction to a particular receiving characteristic. The mechanical structure of the tube, especially because of its grid, makes it sensitive to shock and vibration and subject to breakdown. Its ability to operate with the desired receiving characteristic for extended lengths of time without maintenance or adjustment leaves something to be desired. It is not possible, furthermore, to make all the tube grids identical so that the characteristics of the various channels always deviate slightly. If it is necessary to obtain an accurate interpolation, then compensating elements must be provided each channel to equalize their characteristics. Such a compensation, for a large number of channels, is both time consuming and subject to error.

It is also known in the art to employ a special rotating capacitor for scanning and interpolating the signals carried by a number of channels. This rotating capacitor is provided with a circular group of capacitor plates which correspond in number to the number of information channels. Like the scanning tube, this type of special capacitor can only be constructed for a fixed number of channels; this special capacitor thus has essentially the same disadvantages as the scanning tube. In particular, the capacitance of this arrangement is subject to variations, as a result of mechanical shock or vibration, which can lead to distortion. In addition, the capacitive scanner can not be used for scanning DC voltages.

In order to provide scanning means which can match a varying number of information channels and differing receiving characteristics, a plurality of controllable amplifiers have also been employed to scan and interpolate a number of information channels. These amplifiers, equal in number to the number of channels, are operated by control voltages which follow a prescribed time rule and are applied to successive amplifiers for a prescribed time $\tau$. However, this prior art scanning and interpolating apparatus is subject to the same disadvantages as the other known types of apparatus: it requires special compensating elements for each of the individual information channels to ensure identical signal characteristics on all channels for proper interpolation. In addition, it is scarcely possible to construct controllable amplifiers which can operate over a frequency range from 0 Hertz to high frequencies.

SUMMARY OF THE INVENTION

An object of the present invention, therefore, is to provide a method and apparatus of the type described above which can be utilized with any arbitrary number of input channels and any arbitrary receiving characteristics.

Another object of the present invention is to provide apparatus of the type described above which is highly shock- and vibration-resistant, which is capable of operating for extended times without maintenance or adjustment, and which provides identical characteristics for all information channels without requiring individual compensating elements.

A further object of the present invention is to provide apparatus of the type described above which is capable of scanning signals having a frequency range from 0 Hertz to high frequencies, and apparatus which permits a variation in both the sequence and the speed with which the channels are scanned.

These, as well as other objects which will become apparent in the discussion that follows, are achieved, according to the present invention, by scanning, without interpolation, the three or more signals $u_a(x)$, $u_b(x)$ and $u_c(x)$ which are nonzero for a particular propagation azimuth $x$ of the acoustic waves; multiplying each of these signals by a time function $g_a(t)$, $g_b(t)$ and $g_c(t)$, respectfully, all of which are matched to the receiving characteristics and remain the same for every scan; adding the product together to form the sum function: $u(t) = u_a(x) \cdot g_a(t) + u_b(x) \cdot g_b(t) + u_c(x) \cdot g_c(t)$ and determining the point in time ($t_m$) at which this sum function is a maximum. This value $t_m$ can then be indicated on a time scale as a measure of the azimuth $x$.

According to a further embodiment of the present invention, a noninterpolating electronic switching network is provided to scan the three or more information channels and pass the receiving amplitudes $u_a(x)$, $u_b(x)$ and $u_c(x)$ to the multipliers. Switches can be made sufficiently identical to obviate the requirement for compensating elements. By employing electronic switches, in contrast to mechanical switches, such as rotary selectors, it is possible to employ the technology of integrated circuits and thus achieve a high degree of reliability, shock and vibration resistance and drift-free operation with only a minimum constructional size.

In addition, electronic switches can be made to exhibit a broadband response from 0 Hertz to very high frequencies. To increase the number of channels, it is only necessary to arrange additional switches in parallel.

Since the interpolation is effected by the same apparatus for all the input information channels, a drift in the operation of this interpolator will not affect the accuracy of the interpolation. If the receiving characteristic or the receiving frequency is changed, the interpolator can be appropriately adapted without changing the switching network.

The switching network has the additional advantage of permitting a change in the speed and the sequence with which the information channels are scanned according to any desired program.

A function generator can be provided to produce the time functions $g_a(t)$, $g_b(t)$ and $g_c(t)$ which match the receiving characteristics. The actuation of the switching network as well as the control of the function generator can be advantageously effected by a pulse generator-driven shift register, the number of resister positions of which corresponds to the number of receiving channels.

DESCRIPTION OF THE PREFERRED EMBODIMENT

Figure 1A:
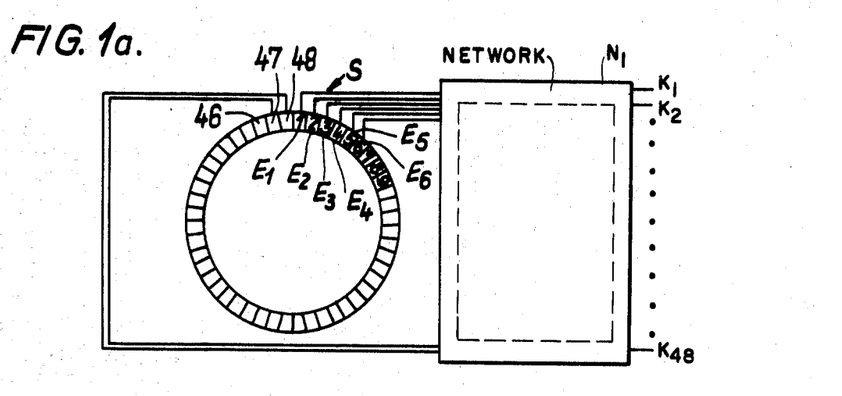
FIGS. 1a and 1b, taken together, are a block diagram of apparatus according to a preferred embodiment of the present invention, for determining the direction of propagation of acoustic waves.
Figure 1B:
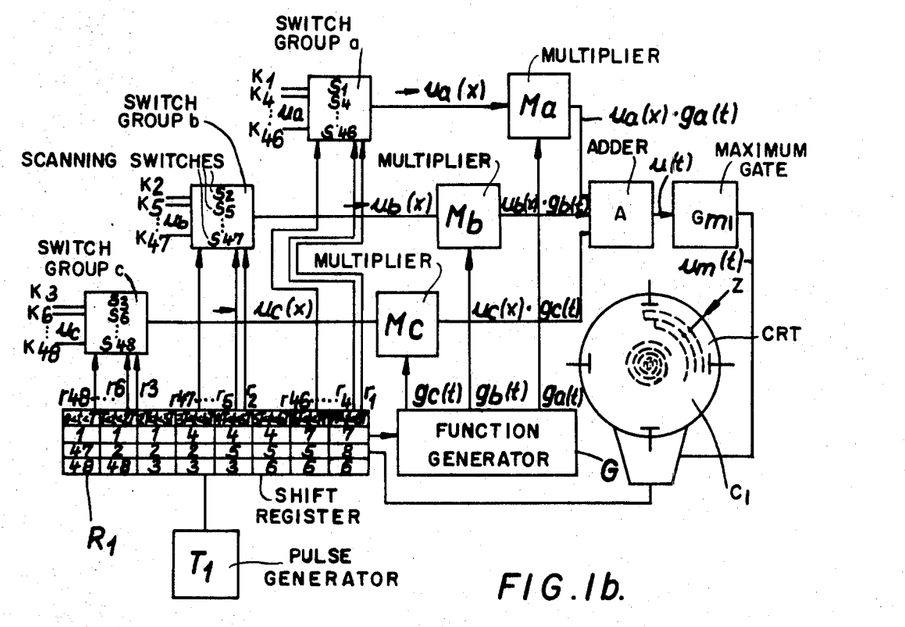

Referring now to the drawings, FIGS. 1a and 1b, taken together, illustrate one embodiment of the apparatus, according to the present invention for determining the direction azimuth of propagation of acoustic waves. The apparatus includes 48 directional receivers $E_1$ to $E_{48}$ arranged around the circumference of a circle. These receivers detect the presence of an acoustic signal S—for example, sound or sonar waves in water—and convert this acoustic signal into an electrical voltage.

Figure 1C:
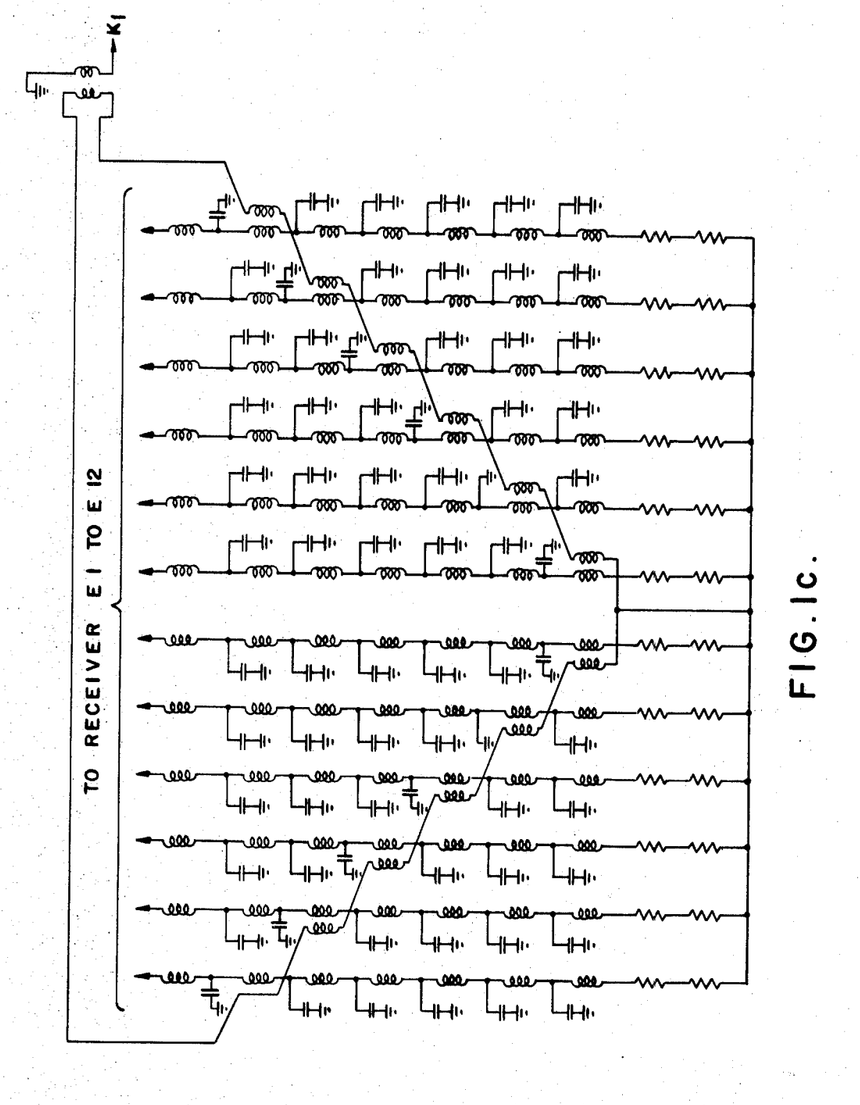
FIG. 1c is a detail view of a portion of the delay-line-network of FIG. 1q.

The outputs of the 48 receivers, $E_1$ to $E_{48}$, are connected to a delay network $N_1$ which combines the output signals of the receivers, for example in groups of 12, as illustrated in FIG. 1c, and produces a distribution of output voltages on 48 channels, one for each group. The value of the output voltages depends on the strength of the incoming signal S and on the receiving characteristic $R_1(x), R_2(x) ... R_{48}(x)$ of the particular one of the 48 groups, where $x$ is the azimuth of propagation of the acoustic signal S. A delay network which may be used for this purpose is described in "Fundamentals of Sonar" by J. W. Horton (United States Naval Institute 1957, Library of Congress Catalog Card No. 56–10026) pages 247–249.

The 48 receiving characteristics all have the same shape. To a close approximation they may be described by a sine function. For example, the direction characteristic of the first characteristic $R_1(x)$ may be given by:

$$R_1(x) = \begin{cases} 0 & \text{for } x < 0 \\ \sin \dfrac{\pi x}{\alpha} & \text{for } 0 \leq x \leq \alpha \\ 0 & \text{for } x > \alpha \end{cases}$$

The variable $x$, the angle of incidence of the acoustic signal S, assumes values in the region: $0 \leq x \leq 2\pi$.

Figures 2, 3:
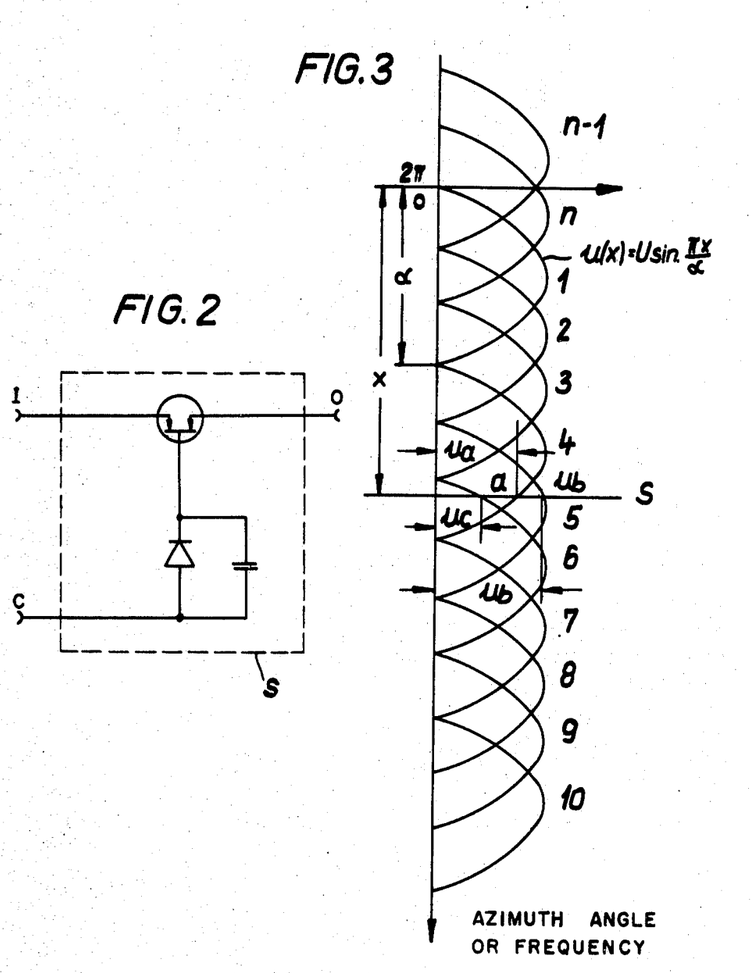
FIG. 2 is a schematic diagram of an electronic switch used in the apparatus of FIG. 1.
FIG. 3 is a graph, in rectangular coordinates, of the received acoustic signal S 37 signal S against the azimuth angle $x$ for 10 information channels of the apparatus of FIG. 1.

FIG. 3 is a graph of a number of these receiving characteristics. As may be seen, these functions overlap so that given an acoustic signal S propagating in the direction $x$, three receiver groups—for example, the receiver groups which have receivers $E_4$, $e_5$ and $E_6$ located at their center—will produce a voltage.

The nonzero voltage produced by the three receiver groups will appear simultaneously as an information signal of their three corresponding information channels; e.g., $K_4$, $K_5$ and $K_6$. These three information signals or voltages will be designated in the discussion that follows, as $u_a(x)$, $u_b(x)$ and $u_c(x)$. They take the values:

$$u_a(x) = U \sin \dfrac{\pi x}{\alpha}$$

$$u_b(x) = U \sin \left( \dfrac{\pi x}{\alpha} - \dfrac{\pi}{3} \right)$$

$$u_c(x) = U \sin \left( \dfrac{\pi x}{\alpha} - \dfrac{2\pi}{3} \right)$$

where the voltage $U$ is proportional to the acoustic pressure of the acoustic signal S at the point of observation.

The information channels $K_1$ to $K_{48}$ which receive signals from the receiver groups are connected to the inputs of electronic switches $s_1$ to $s_{48}$ as shown in FIG. 1b. One of these electronic switches is illustrated in FIG. 2. It may consist, for example, of a field-effect transistor connected between an input I and an output O and controlled by an input C. If 0 volts is applied to input C, the field-effect transistor will be rendered conductive so that the resistance between the input I and the output O will fall to approximately 300 ohms. If a voltage of +24 volts is applied to the input C, the transistor will exhibit a resistance between the input I and the output O of approximately $10^3$ megohms.

The switching voltage for the input C is produced by a 48-position shift register $R_1$. This register has 48 outputs $r_1$ to $r_{48}$. Three adjacent ones of these outputs always lie at 0 volts while all the remaining outputs lie at 24 volts. Since the shift register is a well-known and commercially available device, it will not be described in detail here.

The shift register $R_1$ is controlled by a square wave generator $T_1$. This generator produces rectangular pulses 25 microseconds wide at a frequency of 20 kHz.

If, for example at a particular time the outputs $r_1$, $r_2$ and $r_3$ of the shift register $R_1$ lie at zero volts (while the remaining outputs lie at +24 volts) the switches $s_1$, $s_2$ and $s_3$ will be rendered conductive. After a time $\tau = 50$ $\mu$sec., the generator $T_1$ will shift the shift register so that the outputs $r_2$, $r_3$ and $r_4$ will lie at 0 volts. In this case the switches $s_2$, $s_3$ and $s_4$ will be conductive.

The 48 information channels $K_1$ to $K_{48}$ are scanned according to the program set forth in the register block $R_1$ shown in FIG. 1b. For example, the neighboring channels $K_1$, $K_2$ and $K_a$re simultaneously scanned during the time $t$ is $2\tau < t < 3\tau$. During this time the information signals on channels $k_1$, $k_2$ and $k_3$ form the functions $u_a(x)$, $u_b(x)$ and $u_c(x)$, respectively.

The switching, or scanning, is effected in uniform periods. For example, if $\tau = 50$ $\mu$sec., the switching will be effected at regular 50 $\mu$sec. intervals, consecutively for three channel groups $a$, $b$, and $c$ and the information values $u_a(x)$, $u_b(x)$ and $u_c(x)$ in each group of three channels will be scanned for the time of $3\tau = 150$ $\mu$sec.

As may be seen in FIG. 1b, the outputs of the switches s are fed to the inputs of three multipliers $M_a$, $M_b$ and $M_c$. The channels $K_1$, $K_4$, $K_7$, $K_{10}$, $K_{13}$...$K_{46}$ are switched through to the multiplier $M_a$; and the channels $K_2$, $K_5$, $K_8$, $K_{11}$, $K_{14}$...$K_{47}$ are switched through to the multiplier $M_b$; and the channels $K_3$, $K_6$, $K_9$, $K_{12}$, $K_{15}$...$K_{48}$ are switched through to the multiplier $M_c$. The electronic multipliers $M_a$, $M_b$ and $M_c$ are well known in the art and are described, for example, in the following publication: A Transistorized Variable Area Analogue Multiplier, S. G. S.—Fairchild Application—Report, AR 126 Jan. 1965).

Applied to the other inputs of the multipliers are the voltages $g_a(t)$, and $g_b(t)$ and $g_c(t)$ which are produced by the function generator G. These voltages are described by the following function:

$$g_a(t) = \sin \frac{\pi t}{3\tau}$$

$$g_b(t) = \sin \left(\frac{\pi t}{3\tau} - \frac{\pi}{3}\right)$$

$$g_c(t) = \sin \left(\frac{\pi t}{3\tau} - \frac{2\pi}{3}\right)$$

where $0 < t < 3\tau$.

Figures 4, 5, 6:
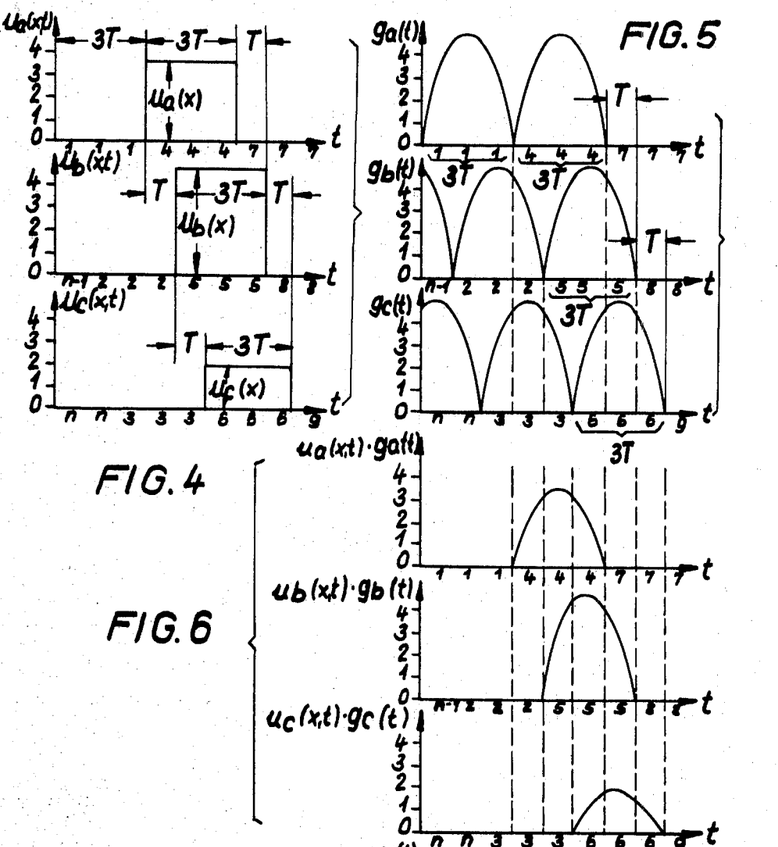
FIG. 4 is a graph showing the voltages scanned from the three information channels which simultaneously receive the acoustic signal S for the example according to FIG. 3.
FIG. 5 is a graph showing the output voltages of the function generator in the apparatus of FIG. 1.
FIG. 6 is a graph of the product voltages at the output of the multipliers in the apparatus of FIG. 1.
Figure 7:
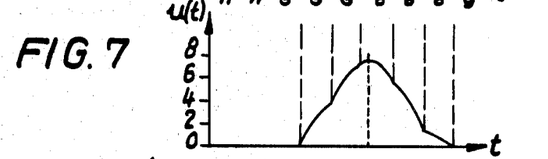
FIG. 7 is a graph of the sum voltage at the output of the adder in the apparatus of FIG. 1.

The graphs shown in FIGS. 4 and 5 illustrate the time dependence and the relative time relationship of the voltages at the outputs of the channel and switch groups a, b, and c and the function generator G. The voltages at the outputs of the three multipliers $M_a$, $M_b$ and $M_c$ are shown in FIG. 6; these outputs correspond to the products $u_a(x) \cdot g_a(t)$, $u_b(x) \cdot g_b(t)$ and $u_c(x) \cdot g_c(t)$. The sum of these products $u(t)$ is then formed in the adder A. The output of the adder A will then be:

$$u(t) = U \sin \frac{\pi x}{\alpha} \sin \frac{\pi t}{3\tau} + U \sin \left(\frac{\pi x}{\alpha} - \frac{\pi}{3}\right) \sin \left(\frac{\pi t}{3\tau} - \frac{\pi}{3}\right)$$
$$+ U \sin \left(\frac{\pi x}{\alpha} - \frac{2\pi}{3}\right) \sin \left(\frac{\pi t}{3\tau} - \frac{2\pi}{3}\right)$$

This voltage has a maximum at the time $t_m$, which maximum may be calculated in the following manner:

$$\frac{du(t)}{dt} = 0 \text{ for } t = t_m$$

Using the equation for $u(t)$ given above;

$$t_m = \frac{3\tau}{\alpha} x$$

$$u(t_m) = \frac{3}{2} U$$

That is, $t_m$ varies linearly with x while the amplitude at the time $t_m$ is proportional to the amplitude of the signal U. A linear interpolation has thus been obtained.

Figure 8:
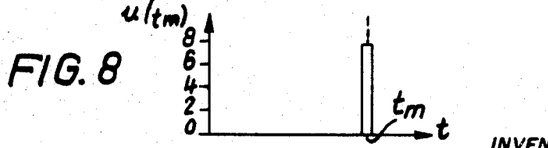
FIG. 8 is a graph of the maximum voltage at the output of the maximum gate in the apparatus of FIG. 1.

The sum voltage $u(t)$ is therefore passed through a maximum gate $G_{m1}$ which produces a pulse $u_m(t)$ at the time $t_m$, as shown in FIG. 8. The construction and operation of this gate $G_{m1}$ will now be described with reference to the circuit of FIG. 14 and the waveform diagrams of FIG. 15, respectively.

Figure 14:
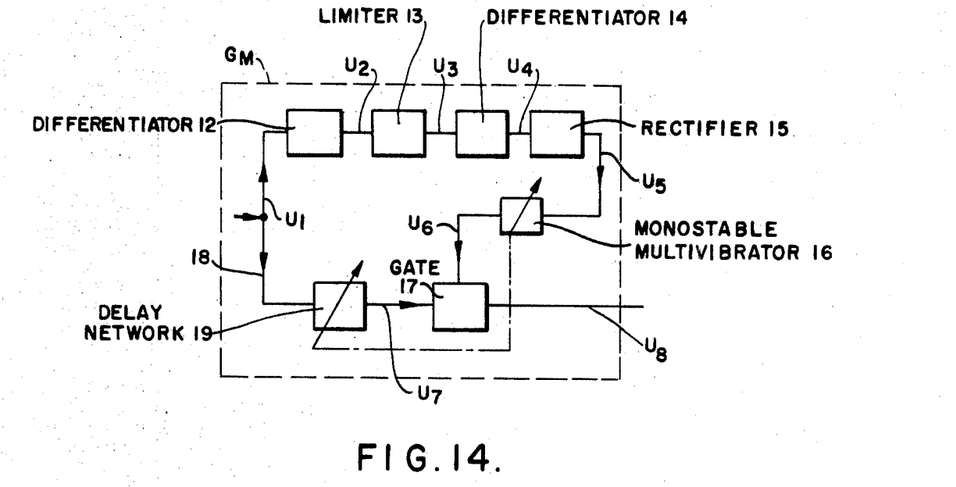
FIG. 14 is a block diagram of the maximum gate used in the apparatus of FIGS. 1, 9 and 17.
Figure 15:
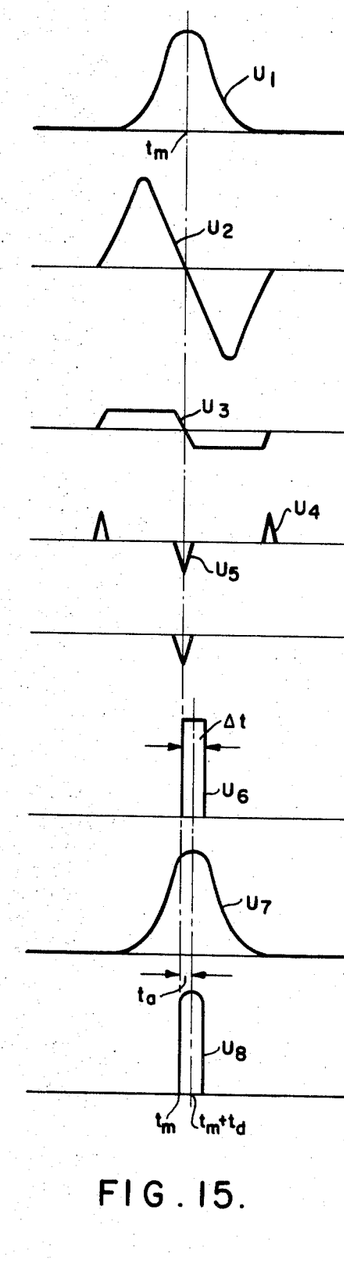
FIG. 15 is a graph of the various voltages appearing in the maximum gate of FIG. 14.

The maximum gate $G_{m1}$ serves to derive a narrow pulse $U_8$ which is limited to a narrow time region adjacent to the time $t_m$ at which the bell-shaped input pulse $U_1$ is a maximum. For this purpose, the input pulse $U_1$ is differentiated in a differentiating stage 12 and the result in signal $U_2$ clipped in a limiter 13. The limited signal $U_3$, which has a zero crossing at the point corresponding to the maximum of the received voltage $U_1$, is differentiated in a further differentiating stage 14. The signal $U_4$ coming from this differentiating stage 14 is fed into a rectifier 15 which only permits passage of the center, negative, peak of the three voltage peaks of the voltage signal $U_4$ generated in the differentiating stage 14. This voltage peak $U_5$ is converted by a monostable multivibrator 16 into a gating pulse $U_6$ having a gate opening duration of $\Delta T$, which pulse is delivered to control the opening of a gate 17.

At the same time, the input of $U_1$ passes over line 18 via a delay network 19 to the main input of the gate 17 in the form of a delayed pulse $U_7$. The delay time $t_d$ of network 19 is adjusted to correspond to one-half the duration $\Delta T$ of the gate opening pulse $U_6$. In this way, only a narrow portion of the delayed pulse $U_7$ is passed by gate 17 yielding a narrow pulse $U_8$ which is centered about a time $t_m + t_d$ slightly later than the time $t_m$ at which the maximum of the input pulse $U_1$ occurred. Since the delay time $t_d$ may be made insignificantly small, the center of the output pulse $U_8$ may be considered to all at the time $t_m$. The height of the output pulse $U_8$ will correspond to the maximum height of the input pulse $U_1$.

With reference again to FIG. 1b, then, the output of $u_m(t)$ of the maximum gate Ghd m1 is supplied to the grid of a cathode-ray tube $C_1$ to modulate the intensity of light on the CRT-screen. The electron beam inside the tube is rotated in a circle about the center of the screen in synchronism with the scan of the information channels $K_1$ to $K_{48}$. In this way, if an acoustic signal impinges upon the receivers $E_1$ to $E_{48}$ from the north, for example, it will be scanned at just that moment when the electron beam of the cathode-ray tube impinges on the screen at the position that is designated as being north. Since the interpolation mechanism will then, at this time, detect the presence of the incoming acoustic signal, the strength of the electron beam will momentarily increase leaving a trace Z on the screen. By filtering through only the maximum of the voltage $u(t)$ by means of the maximum gate $G_{m1}$, it is possible to achieve high definition on the screen of the cathode-ray tube and, in turn, a high directional accuracy with only a limited number of receiver groups.

Figure 9:
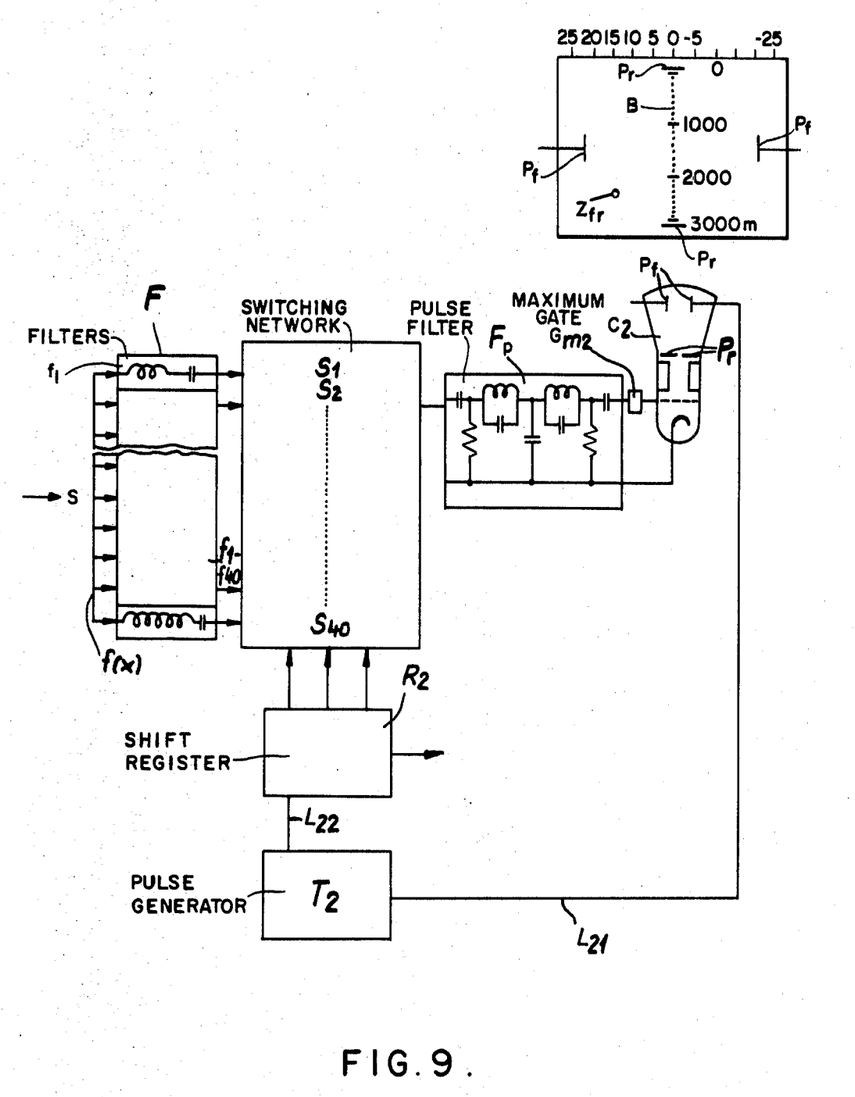
FIG. 9 is a block diagram of frequency analysis apparatus, according to another preferred embodiment of the present invention, for determining the Doppler shift in acoustic waves.
Figure 10:
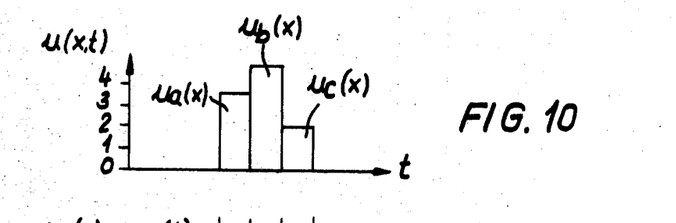
FIG. 10 is a graph of the output voltages of the switching network in the apparatus of FIG. 9.

Reference is now made to FIG. 9, which illustrates apparatus according to another embodiment of the present invention and to the exemplary waveforms shown in FIGS. 10- —13. While determining the direction of a moving target using the reflection or echo technique, it is possible to determine the radial component of the target speed by measuring the Doppler shift of the target-reflected acoustic signal. When utilizing a signal voltage with an operating frequency, for example, of 10 k.c.p.s., a radial speed of plus or minus 45 knots will produce a frequency deviation of about plus or minus 300 c.p.s. By heterodyning with a frequency of 9 k.c.p.s. signal voltages are produced with frequencies, for example of 692 k.c.p.s. to 1308 k.c.p.s.

Figure 16:
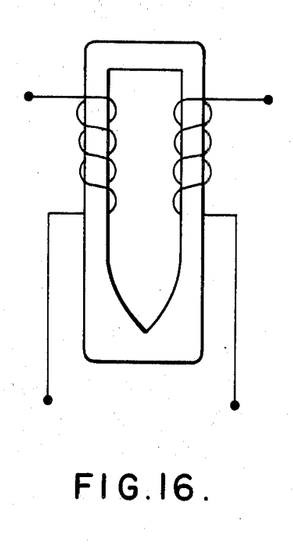
FIG. 16 is a schematic diagram of a magnetostrictive bandpass filter which may be used in the apparatus of FIG. 9.

The signal voltage $f(x)$, the frequency of which is dependent on the frequency of the acoustic signal s, is supplied to a group F of 40 filters $f_1$...$f_{40}$, the outputs of which are connected, in turn, to the inputs, respectively, of 40 switches $s_1$, $s_2$...$s_{40}$. For example, the filters may be of the electromechanical type, constructed as magnetostrictive oscillators as shown in FIG. 16. The 40 switches may be constructed with a field-effect transistor as shown in FIG. 2.

The outputs of the 40 switches are connected together and fed to a pulse filter $F_p$. From there the signal is fed through the maximum gate $G_{m2}$ to the grid of a cathode-ray tube $C_2$ which visually indicates the Doppler shift. The electron beam of the cathode-ray tube $C_1$ is deflected from left to right in synchronism with the scanning of the 40 filters $f_1$ to $f_{40}$ by a deflection voltage applied to the pair of plates $P_f$. The voltage output of the maximum gate $G_{m2}$ effects a momentary sharp increase in the strength of the electron beam to produce a luminous spot on the tube screen.

The deflection of the electron beam of the cathode-ray tube as well as the technique for scanning the filters F is controlled in the same manner described with reference to the embodiment of FIG. 1. A pulse generator $T_2$ controls the deflection of the cathode-ray tube $C_2$ via a control line $L_{21}$ and shifts the shift register $R_2$ via a control line $L_{22}$. The shift register sequentially connects the outputs of the filters $f_1$ to $f_{40}$ to the input of the pulse filter $F_p$ by means of the switches $s_1$ to $s_{40}$, respectively, with a time program analogous to that described in connection with the apparatus of FIG. 1.

The central frequencies passed by the 40 filters $f_1$ to $f_{40}$ are spaced a constant distance of $\frac{\alpha}{3} = 14$ Hz apart. Each filter curve follows the function:

$$f(x) = \begin{cases} 0 & \text{for } x < 0 \\ U \sin \frac{\pi x}{\alpha} & \text{for } 0 < x < \alpha \\ 0 & \text{for } x > \alpha \end{cases}$$

Here the variable $x$ is the frequency in the region:

$$0 < x < \frac{40}{3}\alpha$$

where $\alpha = 52$ Hz.

FIG. 3 indicates the $x$ dependence of various functions $f(x)$ where $x$, instead of being the azimuth angle as in the case of the first embodiment, now represents the frequency.

The filter curves are chosen so that for any given frequency $x$, three adjacent curves will overlap.

If a voltage $U \sin 2\pi x t$ having a frequency $x$ is applied to three such adjacent filters, designated here as $f_a$, $f_b$ and $f_c$, the resulting rectified output voltages will be described by:

$$u_a(x) = U \sin \frac{\pi x}{\alpha}$$

$$u_b(x) = U \sin \left( \frac{\pi x}{\alpha} - \frac{\pi}{3} \right)$$

$$u_c(x) = U \sin \left( \frac{\pi x}{\alpha} - \frac{2\pi}{3} \right)$$

These voltages will lie at the inputs of the respective three adjacent switches of the group $s_1$ to $s_{40}$; i.e., $s_a$, $s_b$ and $s_c$. If the shift register $R_2$ is constructed to produce 0 volts on one of its 40 outputs and +24 volts at its remaining 39, the shift register will allow one electronic remaining to open at a time while blocking all the rest. The pulse generator $T_2$ produces a switching pulse every 5 μsec. to shift the zero control volt signal from one output of the shift register $R_2$ to the next. That is, if three adjacent shift register outputs, designated as $O_a$, $O_b$ and $O_c$, are connected to the respective switches $s_a$, $s_b$ and $s_c$, these three switches will sequentially pass the three voltages $u_a$, $u_b$ and $u_c$ via a common output to the pulse filter Fp.

The input voltage to the pulse filter $F_p$ will, therefore, constitute a sequence of three rectangular pulses having a width $\tau = 5$ μsec. and consecutive amplitudes $u_a$, $u_b$ and $u_c$, as shown in FIG. 10.

The pulse filter $F_p$ has the characteristic that with a rectangular input pulse of amplitude $u(x)$ it produces an output voltage:

$$u(x,t) = u(x) \cdot a_0(t)$$

where $a_0(t)$ is the so-called rectangular step function response of the filter. The pulse filter $F_p$ employed in this embodiment is so dimensioned that, to a close approximation, its step response will assume the function:

$$a_0(t) = \begin{cases} 0 & \text{for } t < 0 \\ \sin \frac{\pi t}{3\tau} & \text{for } 0 < t < 3\tau \\ 0 & \text{for } t > 3\tau \end{cases}$$

Such a filter is well known in the art and is described, for example, in the following publications:

R, Unbehauen, Willi Hohneker, Ernst Lampert, Ueber die Synthese elektrischer Vierpole mit vorgeschriegener Impulsantwort, A.E.U. 1965/Heft 7.

J. Jess, W. Schussler, Filter mit guenstigem Einschwingverhalten, A.E.U. 1962/Heft 3.

W. E. Thompson, Networks with Maximally-Flat Delay, "-Wireless Engineer"Engineer," Oct. 1952.

In particular, it is possible to employ the filter designated 64.05:S, described in the Jess-Schuessler publication, designed for a cutoff-frequency of 175 k.c.p.s. This filter closely approximates the equation given above for $a_o(t)$ so that the following voltage will appear at its output:

$$u(x, t) = u_a(x) \sin \frac{\pi t}{3\tau} + u_b(x) \sin \left( \frac{\pi t}{3\tau} - \frac{\pi}{3} \right) + u_c(x) \sin \left( \frac{\pi t}{3\tau} - \frac{2\pi}{3} \right)$$

This voltage has a maximum at time $t_m$ which may be computed by letting its time derivative equal 0:

$$\frac{du(x, t)}{dt} = 0; \quad t = t_m$$

This yields:

$$t_m = \frac{3\tau}{\alpha} \cdot x; \quad u(t_m) = \frac{3}{2} \cdot U$$

It may, therefore, be seen that the time $t_m$, at which the output voltage is maximum, is proportional to the frequency $x$. The amplitude $u(t_m)$ of the output signal is independent of $x$ and proportional only to the amplitude $U$ of the input signal.

Figure 11:
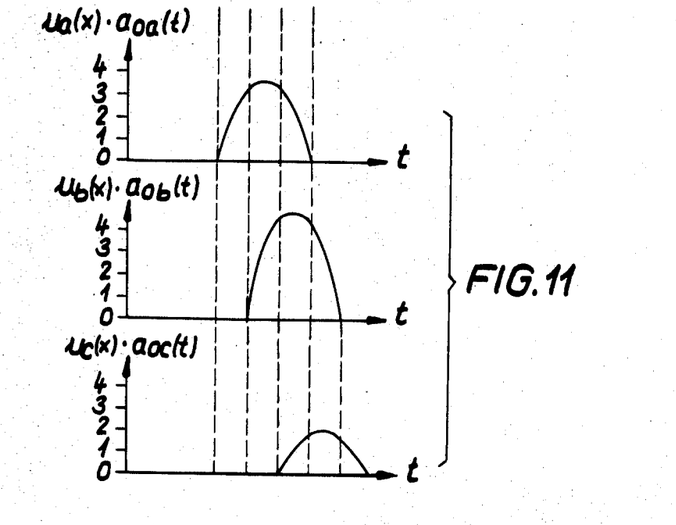
FIG. 11 is a graph of the output voltages of the pulse filter in the apparatus of FIG. 9 for the different output voltages of the switching network shown in FIG. 10.
Figure 12:
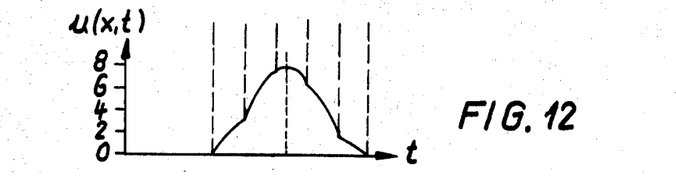
FIG. 12 is a graph of the sum voltage at the output of the pulse filter in the apparatus of FIG. 9.
Figure 13:
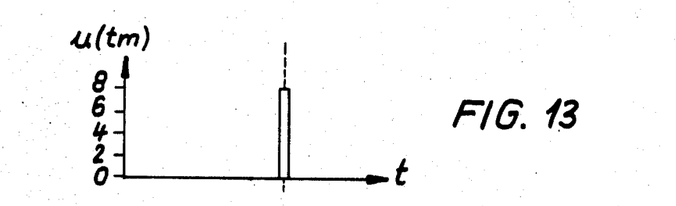
FIG. 13 is a graph of the maximum voltage at the output of the maximum gate in the apparatus of FIG. 9.

FIG. 11 shows the pulse responses of the pulse filter $F_p$ for the individual pulses $u_a(x)$, $u_b(x)$ and $u_c(x)$, which are consecutively switched through from the three active filters $f_a$, $f_b$ and $f_c$. FIG. 12 illustrates the signal which will appear at the output of the filter $F_p$ as a result of the superposition of the three pulses of FIG. 11. By employing the maximum gate $G_{m2}$ of the type described in connection with the apparatus of FIG. 1, a narrow pulse utm(at time $t_m$ is generated from the output of the pulse filter $F_p$. This pulse $u_m(t)$ can then be used to indicate the true frequency of the acoustic signal, as interpolated between the discrete steps of the frequency filter F.

This pulse may be employed, for example, to illuminate a spot on the screen of the cathode-ray tube $C_2$ to indicate the frequency or Doppler shift at this particular moment.

FIG. 9 illustrates a cathode-ray tube screen which can be used not only to indicate the Doppler shift representative of a radial speed of a target, but also to indicate the distance of the target. To this end, the cathode-ray tube electron beam is deflected into two orthogonal directions: it is deflected into a horizontal direction by a first pair of plates $P_f$ to indicate the Doppler shift or, more particularly, the radial speed of the target, and is deflected in the vertical direction from top to bottom by a second pair of plates $P_r$ to indicate the distance.

The cathode-ray tube is provided with a speed scale in the horizontal direction having a zero point at the center of the screen. From this zero point are indicated the negative radial speeds, from −5 to −25 knots, toward the right and the positive radial speeds, from +5 to +25 knots, toward the left.

The orthogonally oriented second pair of plates $P_r$ is used to deflect the electron beam of the cathode-ray tube from the top to the bottom of the screen, for example, with a sawtooth waveform. The electron beam is deflected from the top to the bottom of the screen with such a speed as to form a distance region from 0 to 3,000 meters on an appropriate linear scale.

When an echo pulse is received, therefore, and the electron beam is gated to produce a spot on the screen, this spot $Z_{fr}$ may indicate, for example, that the target lies at a distance of 2,400 meters and approaches the viewing vessel with a radial speed of 15 knots, as shown.

It should be noted that echoes from stationary objects will also be indicated in the region of the screen designating the radial speed to be zero. The cathode-ray tube may thus be used to track these echoes; in particular, the ground echoes B.

Figure 17:
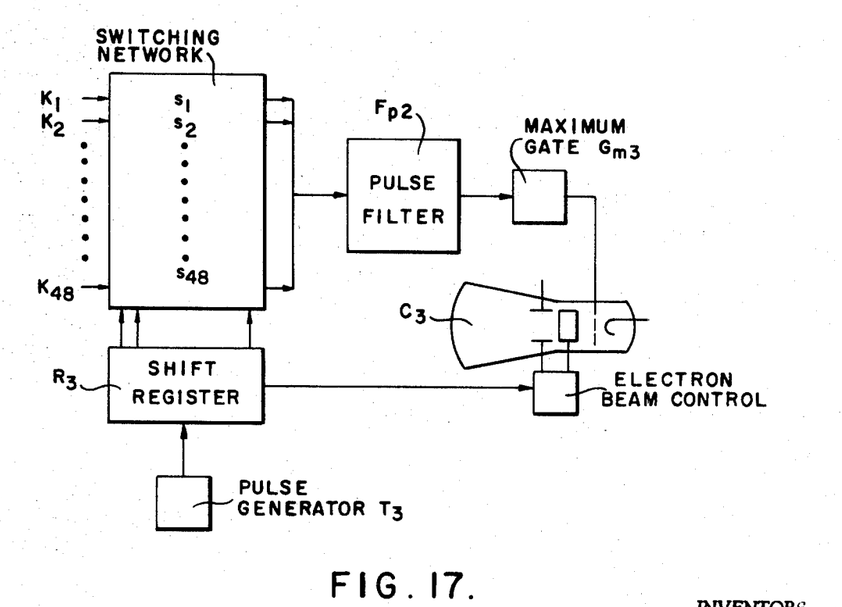
FIG. 17 is a block diagram of apparatus, according to a still further preferred embodiment of the present invention, for determining the direction of propagation of acoustic waves.

FIG. 17 illustrates the application of a pulse filter of the type used in the apparatus of FIG. 9 to the azimuth-finding apparatus of FIG. 1. In this third embodiment of the present invention, the 48 information channels $K_1$ to $K_{48}$ are likewise connected to a series of 48 electronic switches $s_1$ to $s_{48}$ of the type shown in FIG. 2. These switches may be consecutively closed in any prescribed sequence (e.g., the simplest sequence $s_1, s_2, s_3...s_{47}, s_{48}$, by the shift register $R_3$ to pass the voltages on the information channels to the pulse filter $F_{p2}$. The pulse filter forms the product of each consecutive signal voltage $u_a(x)$, $u_b(x)$ and $u_c(x)$ with its pulse response $a_o(t)$ to produce a signal, at its output, which may be described by the sum:

$$u(x,t) = u_a(x)a_{0a}(t) = u_b(x)a_{0b}(t) + u_c(x)a_{0c}(t).$$

As in the case of the embodiments illustrated in FIGS. 1 and 9, this sum signal is then passed through a maximum gate $G_{m3}$, of the type shown in FIG. 14, to produce a narrow pulse $u_m(t)$ at the moment that the pulse filter output signal is a maximum. This narrow pulse is supplied to an indicator, such as the cathode-ray tube $C_3$ which displays the information as the value of the azimuth. Both the shift register $R_3$ and the cathode-ray tube obtain synchronizing time reference pulses from the pulse generator $T_3$.

It will be understood that the above description of the present invention is susceptible to various modifications, changes and adaptations. In the three embodiments described above, for example, the electronic switches were controlled by a shift register which always closed adjacent switches for a constant time. It is also possible to vary the switching time $\tau$, for example to adapt to different receiving characteristics unsymmetrically distributed about the circumference of the receiving circle.

In addition, it is possible to interpolate not only between adjacent but also between any arbitrary channels which carry information signals which overlap each other and belong to a common receiving signal. The opening and closing of the electronic switches can be accomplished, for example, by an electronic counter which was capable of being programmed to open and close arbitrary groups of switches.

It is also possible, when determining the azimuth of a target using sound waves in water, to employ signals which, instead of being the simple receiving characteristics of the individual receiver groups, result from the multiplication and integration of the signals of each two half-groups. These signals would thus represent correlation functions.

We claim:

1. In an apparatus for determining the azimuth $x$ of propagation of acoustic waves by scanning $n$ ($n \geq 3$) information channels carrying signals which are a function of $x$, three or more of which signals are nonzero for the same valve of $x$, and evaluating the azimuth $x$ by interpolating between said three or more signals, the improvement comprising, in combination:
   a. means for scanning said $n$ channels to produce successive signals representative, respectively, of the value of said three or more signals; and
   b. means, connected to said scanning means, for interpolating said azimuth $x$ from the signals produced by said scanning means, said interpolating means including:
      1. pulse filter means, connected to said scanning means, for multiplying each of said successive signals produced by said scanning means by the pulse response of said filter means;
      2. means, connected to said pulse filter means, for determining the time at which the signal formed by said pulse filter means is at a maximum; and
      3. means, connected to said determining means, for indicating the value of time produced by said determining means as the value of $x$.

2. In a method of determining the Doppler shift in acoustic waves by successively scanning $n$ ($n \geq 3$) information channels carrying signals which are a function of the frequency of said acoustic waves, three or more of which signals are nonzero for the same frequency value, and evaluating the frequency, and, thus, the Doppler shift, by interpolating between said three or more signals, the improvement comprising the steps of:
   a. successively scanning said three or more signals without interpolating; and
   b. interpolating said frequency from the signals produced by scanning said three or more signals by:
      1. successively multiplying each of said three or more signals, produced by scanning, by the pulse response of a pulse filter, and
      2. determining the time at which the signal formed as the product of said multiplication is at a maximum.

3. Apparatus for measuring the Doppler shift in acoustic waves comprising in combination:
   a. transducer means for receiving said acoustic waves and producing a signal having a frequency which is dependent upon the frequency of said acoustic waves;
   b. a plurality of band-pass filters connected to receive said signal, each of said band-pass filters being tuned to a different frequency;
   c. switching network means for successively scanning the outputs of said plurality of filters;
   d. pulse filter means, connected to said switching network means, for multiplying each of the successive signals produced by said scanning means by the pulse response of said filter means;
   e. means, connected to said pulse filter means, for determining the time at which the signal formed by said pulse filter means is at a maximum; and
   f. means, connected to said determining means, for indicating the value of time produced by said determining means as the Doppler shift in said acoustic waves.

4. In an apparatus for determining the azimuth $x$ of propagation of acoustic waves by scanning $n$ ($n \geq 3$) information channels carrying signals which are a function of $x$, three or more of which signals are nonzero for the same value of $x$, and evaluating the azimuth $x$ by interpolating between said three or more signals, the improvement comprising, in combination:
   a. means for scanning said $n$ channels to produce successive signals representative, respectively, of the value of said three or more signals, said scanning means including electronic switch means operative only to transmit said successive signals;
   b. means, connected to said scanning means, for interpolating said azimuth $x$ from the signals transmitted by said scanning means, said interpolating means including:
      1. function generator means for producing function of time signals which are conformal to each other and to said functions of $x$;
      2. means, connected to the output of said electronic switch means, for multiplying each of said signals produced by said scanning means by a respective function of time signal produced by said function generator means;
      3. means, connected to said multiplying means, for adding together the signals formed as products by said multiplying means;
      4. means, connected to said adding means, for determining the value of time at which the signal formed as the sum by said adding means is at a maximum; and
      5. means, connected to said determining means, for indicating said value of time as the value of $x$; and
   c. means for controlling said switch means and said function generator means including:
      1. pulse generator means for producing a pulse train; and
      2. shift register means, having an input connected to receive said pulse train from said pulse generator means and having a plurality of outputs connected to said switch means and said function generator means, for supplying information channel scanning pulses to said switch means and synchronizing pulses to said function generator means.

5. The improvement defined in claim 4, wherein said multiplier means includes a plurality of multiplier circuits, each having two inputs and one output, one of said two inputs being connected to receive one of said successive signals from said switch means and the other of said two inputs being connected to receive one of said conformal functions from said function generator means; wherein said adding means includes an adding circuit having a plurality of inputs, each of which is connected to one of said outputs of said plurality of multiplier circuits, and an output; and wherein said determining means includes a maximum gate circuit having an input connected to the output of said adding circuit and an output connected to said indicating means.

6. The improvement defined in claim 5, further comprising directional receiver means, connected to said $n$ channels, for receiving acoustic waves and supplying said signals which are a function of $x$ to said $n$ channels.

7. The improvement defined in claim 6, wherein said directional receiver means includes $n$ directional receivers arranged at the circumference of a circle.